Jan. 4, 1966    S. A. V. VARBÄCK    3,226,993
THREAD-CUTTING APPARATUS
Filed May 11, 1960

INVENTOR.
Stig Assar Verner Varbäck
BY
ATTORNEY

United States Patent Office 3,226,993
Patented Jan. 4, 1966

3,226,993
THREAD-CUTTING APPARATUS
Stig Assar Verner Varbäck, Enskede, Sweden, assignor to Aktiebolaget Svenska Precisionsverktyg, Nacka, Sweden, a corporation of Sweden
Filed May 11, 1960, Ser. No. 28,481
Claims priority, application Sweden, Dec. 19, 1959, 12,014/59
9 Claims. (Cl. 74—205)

This invention relates to a thread-cutting apparatus.

More particularly this invention relates to a thread-cutting apparatus of the type having a driving and a driven part and members for coupling said parts into direct operation and members for their reversing operation, said first-mentioned members comprising interengaging coupling elements actuated by axial pressure of a spring member and adapted to interrupt the direct driving connection between said two parts on excess of a torque which is predetermined by said spring member and preferably adjustable, said second-mentioned members comprising a stationary retainer for rolling bodies maintained by an axially acting pressure in engagement with an inner rollerway formed on the driving part and an outer rollerway formed on a reversing ring disposed inside said driving part.

One main object of the invention is to provide a thread-cutting apparatus of the type set forth which is reliable in operation and contains a comparatively small number of parts for performing the two operational functions and which further has relatively small dimensions.

A further object of the invention is to provide a thread-cutting apparatus of the type set forth having means to create the axial pressure by spring members of which at least one has no influence on the direct operation of the apparatus.

A still further object of the invention is to provide a thread-cutting apparatus of the type set forth, provided with a radial bearing capable of taking axial thrust in one direction.

Further objects and advantages of the invention will become apparent from the following description, considered in connection with the accompanying drawings which form part of the specification, and of which:

Figure 1:
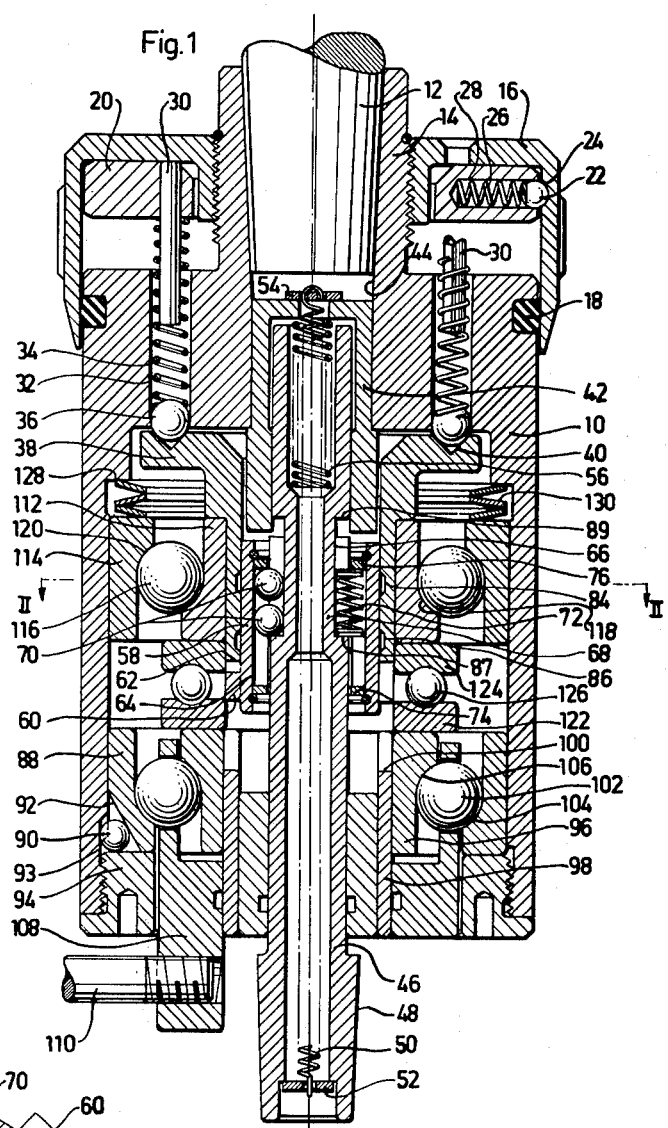
FIG. 1 is a longitudinal sectional view of a thread-cutting apparatus constructed according to the invention, the section being taken along different planes in each half of the figure as indicated by line I—I of FIG. 2.

Referring to the drawings, reference numeral 10 denotes the driving part of a thread-cutting apparatus, said part at the top being connected to a driving spindle 12 intended to be secured in a machine tool. Screwed on to the upper, narrower neck 14 of the driving part 10 is a hood 16, which extends over the part 10 and is sealed against the latter by means of a sealing ring 18. The hood 16 houses an annular member 20, a detent means being disposed between said elements and comprising a ball 22, which enters a cup-shaped recess 24 in the hood, and a spring member 26 inserted into a radial bore 28 in the ring. Several such recesses may be formed along the inner periphery of the hood. The ring 20 serves as a holder for a number of axial, suitably hollow guide pins 30 projecting into axial bores 32 formed in the driving part 10 and also into spring members 34, which engage balls 36. The pins 30 prevent the ring 20 from turning in relationship to the part 10. The detent means 22, 26 in turn prevents the hood 16 from accidental rotation. Thus the hood must be subjected to a torque that forces the ball 22 out of the recess 24 against the action of the spring member 26 in order that the hood be able to perform a turning movement relative to part 10, by which movement the ring 20 is displaced axially and thus a change of tension in spring members 34 is produced. Every time the ball 22 snaps into a recess 24 a rattling noise is produced thereby indicating the magnitude of the turning movement and thus the change of tension in the spring members 34.

Together with a sleeve-shaped element 38 the balls 36 form a clutch transmitting the torque between the driven part and the driving part. In this operation the balls 36 rest in cup-shaped recesses 40 formed in the element 38, and they are forced out of said recesses by compression of the spring members 34 on excess of a torque determined by said spring members.

A sleeve 42 is rigidly secured to the driving part 10 in a central bore 44 formed in said part. The driven part 46 of the thread-cutting apparatus extends from the lower face of the part 10 up into the sleeve 42 which also centers said part 46. The part 46 is substantially tubular with a tapered lower section 48 for connection of a screw tap holder. The part 46 is suspended in the part 10 by means of a long spring member 50, secured in the lower end of the portion 46 by means of a slip washer 52, and at the top in another slip washer 54 disposed on top of the sleeve 42. The slip washers 52 and 54, which may be made of a synthetic plastic material such as nylon or may be constituted by rolling contact bearings, permit the parts 10 and 46 to rotate relatively to one another without the spring member being subjected to any disturbing rotation. A further spring member 56 of larger diameter is disposed at the upper portion of the part 46 and abuts the inner side of the bottom of the sleeve 42. This spring member is compressed when the part 46 approaches said bottom.

Figure 2:
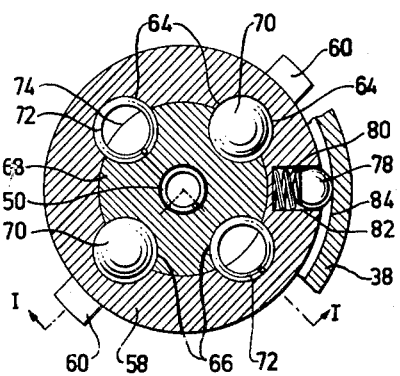
FIG. 2 is a sectional view along line II—II of FIG. 1 presented on a larger scale.

In direct operation the torque is transmitted between the parts 10 and 46 through the clutch 36, 38 and also through a second clutch comprising a sleeve 58 (see also FIG. 2) provided with two diametrically opposed lugs 60 to which correspond notches 62 formed in the clutch element 38. The sleeve 58 has a suitable number of axial grooves 64 of half-circular cross section spaced around its periphery the number of said axial grooves in the embodiment shown being four. Grooves 66 of the same shape formed in a reduced diameter portion 68 of the part 46 register with said grooves 64. Balls 70 are placed in two opposite pair of grooves 64, 66 and in the two remaining pairs of grooves the spring members 72 are located. The balls 70 permit no circumferential but a slight axial displacement of the sleeve 58 relative the part 46, which movement is limited by locking rings 74, 76. The spring member 72 bear against either of the bottoms of grooves 66 and against the locking ring 74 or 76, as will be understood from the following description of this particular constructive detail.

The sleeve 58 has two settings, one upper in direct operation and one lower in reversing operation. The sleeve is retained in one or other of these two positions by means of a detent comprising a ball 78 (FIG. 2) urged into either of two annular grooves 84, 86 in the sleeve element 38 by means of a spring member 80 located in a radial bore 82 formed in the sleeve 58. As will be seen from the figures, the lugs 60 of the sleeve 58 engage the notches 62 of the sleeve element 38, for which reason torque transmission is effected between said parts. The ball 78 is then in the upper groove 84. The spring members 72 are partly compressed between their shoulders, constituted by the lower bottoms 87 of the grooves 66 and the locking ring 76.

If for reversing the direction of rotation of the driven part 46 the driving part 10 is brought upwards in relationship to the driven part 46, the sleeve element 38 and the sleeve 58 will follow. The balls 70 roll in their grooves and during an initial period the spring members 72 are relieved. When the lower ends of the spring members 72 during the continued axial relative motion between the parts 10 and 46 are hit by the locking ring 74 and their upper ends contact the upper ends 89 of the grooves 66, said spring members are compressed once more so as to cause accumulation of an axial force great enough to force the ball 78 out of the groove 84 against the pressure exerted by the spring member 80. The sleeve 58 will snap over and cause the ball 78 to enter the groove 86 in the sleeve element 38 instead. Return to the setting for direct operation is effected by an identical changing of the shoulders actuating the spring members 72. In this operation the tension spring member 50 pulls in the spindle 46 and thereby causes the sleeve 58 to snap over to the setting for direct operation. The forced displacement of the ball 78 may also be initiated by the balls 70 urging against the locking ring 74 or 76 and thereby enforcing the resetting of the sleeve.

An outer bearing ring 88 is disposed in the lower portion of the driving part 10 and is held against rotation in relation to said portion by means of a ball 90 that enters grooves 92, 93 in bearing ring 88 and driving part 10, respectively. The ring 88 bears against an annulus 94 threadingly secured from below in the part 10. An inner bearing ring 96 is rigidly secured to and forms part of a reversing ring member 98 having notches 100 which correspond to the lugs 60 of the sleeve 58 when the latter is in its lower position described above. Between the two bearing rings 88 and 96 balls 102 are disposed in a ring and coact with an outer rollerway 104 formed on the inner surface of ring 88 and an inner rollerway 106 formed on the outer surface of ring 96. A ball cage 108 is held stationary by means of a lever 110 thereby preventing the balls 102 from rotating about the axis of the apparatus. Thus the balls are only allowed to rotate about their own centers. The cage 108 may possibly be made of plastic. The members 88, 96, 98, 102 and 108 cause reverse of the direction of rotation of the driven part 46 after thread-cutting of a hole when the screw tap is to be withdrawn therefrom. The rings 88 and 96 with intermediate balls 102 form a so called single-row type angular contact ball bearing, the axial movement of the inner ring 96 in one direction, that is downwards, being limited by the balls due to the feature that the rollerways 104, 106 form cup-shaped abutments for the balls.

A combined bearing of substantially the same construction is disposed concentrically about and is centering the sleeve element 38, the inner ring 112 of the bearing being disposed on said sleeve element, and the outer ring 114 within the part 10. Balls 116 coact with rollerways 118, 120 on the two rings. Between the two bearings there is interposed a third bearing which is a pure thrust bearing of rolling contact type and consists of two rings 122 and 124 which abut the ring 96 and 112, respectively, and between which a ring of balls 126 is inserted. Between a shoulder 128 formed in the part 10 and the outer ring 114 of the upper bearing spring members 130 are introduced, preferably in the form of cup springs which create an axial pressure on the ring. The rollerways 118, 120 in the upper combined bearing are formed and positioned in such a way as to transmit this axial pressure to the inner ring 112 through the balls 116 and further through the thrust bearing 124, 126, 122 to the inner bearing ring 96 which then exerts a pinching effect on the reversing balls 102 between their rollerways 104, 106.

The apparatus operates in the following way. In direct operation the various parts of the apparatus assume the positions shown in the figures. The driving torque is transmitted from the spindle 12 to the part 10, the spring loaded balls 36, the clutch member 38, the sleeve 58, the balls 70 and further to the driven part 46. The screw tap carried by the latter performs a thread-cutting operation. When this is completed the resistance becomes so great that the driving connection between the parts 36 and 38 of the clutch is interrupted. The balls 36 now rotate together with the part 10 in relation to the stationary sleeve element 38, and snap in and out of the recesses 40 of this element in a rattling motion. The spring members 34 determine the maximum torque transmitted by the clutch 36, 38, and they are adjusted so as to reduce the stressing of the clutch during this idle running to the lowest possible value. When the driving part 10 is brought upwards by the operator, the various elements of the apparatus are entrained except for the driven part 46, whereby the sleeve 58 is caused to switch over to its other limit position stated above and wherein the ball 78 enters the lower groove 86 in part 38. A driving connection is now established between the reversing ring 98 and the sleeve 58 instead of the previous connection between said sleeve and the sleeve element 38. The driving torque from the spindle 12 will now be transmitted through the part 10, the reversing members 88, 102, 96, 98 to the sleeve 58 and from said sleeve to the part 46 through the balls 70. The part 46 will then rotate in the opposite direction so as to withdraw the screw tap from the hole just finished. In this case both springs or spring systems 130 and 34 answer for the axial pressure that determines the maximum torque which the reversing members are capable of transmitting before slipping occurs in them. The pressure of the spring members 34 is effected through the element 38 the inner ring 112 and the thrust bearing 124, 126, 122. The axial pressure of the spring or spring system 130 is transmitted through the outer bearing ring 114, the balls 116, the inner ring 112 and from said ring along the same path as described hereinbefore.

The maximum torque that the thread-cutting apparatus is capable of transmitting during reversing operation is larger than that during direct operation, which is a result of the feature that in thread-cutting of e.g. blind holes, the screw tap may get caught in the end position and must therefore be wrenched loose by a comparatively strong torque. Thus the axial force exerted by the spring system 130 is greater and even essentially greater than the force of the spring system 34. As in direct operation the maximum torque in reversing operation may be varied when necessary by tensioning the spring system 130 differently.

Due to the axial range of movement permitted by the clutch 58, 70 the part 10 needs not accompany the part 46 during the working operations and this structural feature of the apparatus constituted according to the invention assists considerably in avoiding accidental affect on the screw tap by axial forces which detrimentally affect the shape of the thread.

While one more or less specific embodiment of the invention has been shown and described, it is to be understood that this is for purpose of illustration only, and that the invention is not to be limited thereby, but its scope is to be determined by the appended claims.

What I claim is:

1. A thread-cutting apparatus having a rotatable driving part and a rotatable driven part, first coupling members for connecting said parts, when said first coupling members are engaged, to rotate said driven part in direct drive in the same direction as said driving part, and second coupling members for connecting said parts, when said second coupling members are engaged, to rotate said driven part by indirect drive in the reverse direction to said driving part, first spring means interposed between said driving part and said first coupling members and constantly urging said first coupling members into engagement to transmit torque from said driving part to said driven part during direct drive so long as the torque does not exceed a predetermined value, said first coupling members being adapted to disengage to interrupt the direct drive between said two parts when said torque exceeds the predetermined value, said second coupling members comprising rotatable bearing members, a stationary retainer for said bearing members, and outer and inner raceways therefor, said outer raceway being connected to the driving part, a reversing member connected to the driven part during indirect drive thereof and to which said inner raceway is connected, and second spring means exerting axial pressure on said raceways, and positioned to cooperate with said first spring means to cause said second members to transmit torque from said driving part to said driven part to effect reverse drive, without influence on direct drive.

2. A thread-cutting apparatus according to claim 1 wherein means is provided for adjusting the pressure of said first spring means thereby to vary the predetermined maximum torque to be transmitted through said first coupling members.

3. A thread-cutting apparatus according to claim 1, wherein there are serially interposed between one of said first coupling members and said reversing member the inner race of a combined antifriction radial and axial thrust bearing, which is capable of taking axial thrust in one direction, and an axial thrust antifriction bearing, so that said first spring means transmits its axial pressure to said reversing member through one of said two thrust bearings.

4. A thread-cutting apparatus according to claim 3 wherein said one of said first coupling members is mounted on said inner race of said combined antifriction radial and axial thrust bearing, and said drive member is mounted on the outer race of said combined antifriction radial and axial thrust bearing.

5. A thread-cutting apparatus according to claim 3 wherein said second spring means is positioned to engage and transmit its axial pressure to the outer race of said combined radial and axial thrust bearing, whereby said second spring means transmits its axial pressure to said reversing member through said two thrust bearings.

6. A thread-cutting apparatus as claimed in claim 1 wherein an axially movable sleeve is provided to connect said driven part selectively with one of said first coupling members and with said reversing member, and said sleeve surrounds said driven part and is connected to said driven part through axial internal and external grooves on said sleeve and driven part, respectively, and balls which engage in the last named grooves.

7. A thread-cutting apparatus as claimed in claim 2 wherein an axially movable sleeve is provided to connect said driven parts selectively with one of said first coupling members and with said reversing member, and said sleeve surrounds said driven part and is connected to said driven part through axial internal and external grooves on said sleeve and driven part, respectively, and balls which engage in the last named grooves.

8. A thread-cutting apparatus as claimed in claim 3 wherein an axially movable sleeve is provided to connect said driven part selectively with one of said first coupling members and with said reversing member, and said sleeve surrounds said driven part and is connected to said driven part through axial internal and external grooves on said sleeve and driven part, respectively, and balls which engage in the last named grooves.

9. A thread-cutting apparatus as claimed in claim 5 wherein said second spring means transmits greater axial pressure than said first spring means.

References Cited by the Examiner
UNITED STATES PATENTS

| 2,521,585 | 9/1950 | Kurtz et al. | 74—798 |
| 2,536,803 | 1/1951 | Gleason | 74—772 |
| 2,536,992 | 1/1951 | Chester | 74—772 |
| 2,597,849 | 5/1952 | Alfredeen | 74—205 |
| 2,795,146 | 6/1957 | Alfredeen | 74—205 |
| 3,041,893 | 7/1962 | Johnson | 74—792 |

DON A. WAITE, *Primary Examiner.*

BROUGHTON G. DURHAM, *Examiner.*